United States Patent [19]
Izumi

[11] Patent Number: 5,764,140
[45] Date of Patent: Jun. 9, 1998

[54] ELECTRONIC FLASHER SYSTEM

[75] Inventor: Masato Izumi, Tokyo, Japan

[73] Assignee: Niles Parts Co., Ltd., Japan

[21] Appl. No.: 791,732

[22] Filed: Jan. 31, 1997

[30] Foreign Application Priority Data

May 31, 1996 [JP] Japan ................ 8-141131

[51] Int. Cl.$^6$ ........................................ B60Q 1/52
[52] U.S. Cl. .................... 340/471; 340/81 R; 340/458; 315/200 A
[58] Field of Search ............. 340/471, 458, 340/331, 641, 642, 463, 464, 475, 332, 478; 361/100, 101, 103, 104; 323/266, 271; 200/237; 315/200 A; 331/64, 66, 69, 70

[56] References Cited

U.S. PATENT DOCUMENTS

| | | | |
|---|---|---|---|
| 3,973,238 | 8/1976 | Kato et al. | 340/81 R |
| 4,266,212 | 5/1981 | Mizuno | 340/81 R |
| 4,910,496 | 3/1990 | Hatanaka et al. | 340/458 |
| 5,164,636 | 11/1992 | Allaire | 315/200 A |

FOREIGN PATENT DOCUMENTS

| | | |
|---|---|---|
| 55-87630 | 7/1980 | Japan . |
| 64-90831 | 4/1989 | Japan . |
| 2-164629 | 6/1990 | Japan . |

*Primary Examiner*—Jeffery Hofsass
*Assistant Examiner*—Toan Pham
*Attorney, Agent, or Firm*—Ronald P. Kananen

[57] ABSTRACT

An electronic flasher system that reduces the ON duty ratio of an intermittent signal inputted to a semiconductor switch device, thereby suppressing electric power imposed on the semiconductor switch device and, hence, heating thereof, in the event of abnormal heating caused in the semiconductor switch device. The flasher system includes a flasher circuit 21A, a semiconductor switch device 21B, and a device-temperature detecting section 21C arranged in one body to constitute a module unit 21. The device-temperature detecting section 21C is connected to the flasher circuit 21A. The flasher circuit 21A transmits an intermittent signal to the semiconductor switch device 21B so that a direction indicator lamp 1R, 1L connected to the semiconductor switch device 21B is caused to turn-signal flash. The device-temperature detecting section 21C detects a temperature of the semiconductor switch device 21B so that, when the temperature becomes high, the ON duty ratio of the intermittent signal is reduced.

12 Claims, 2 Drawing Sheets

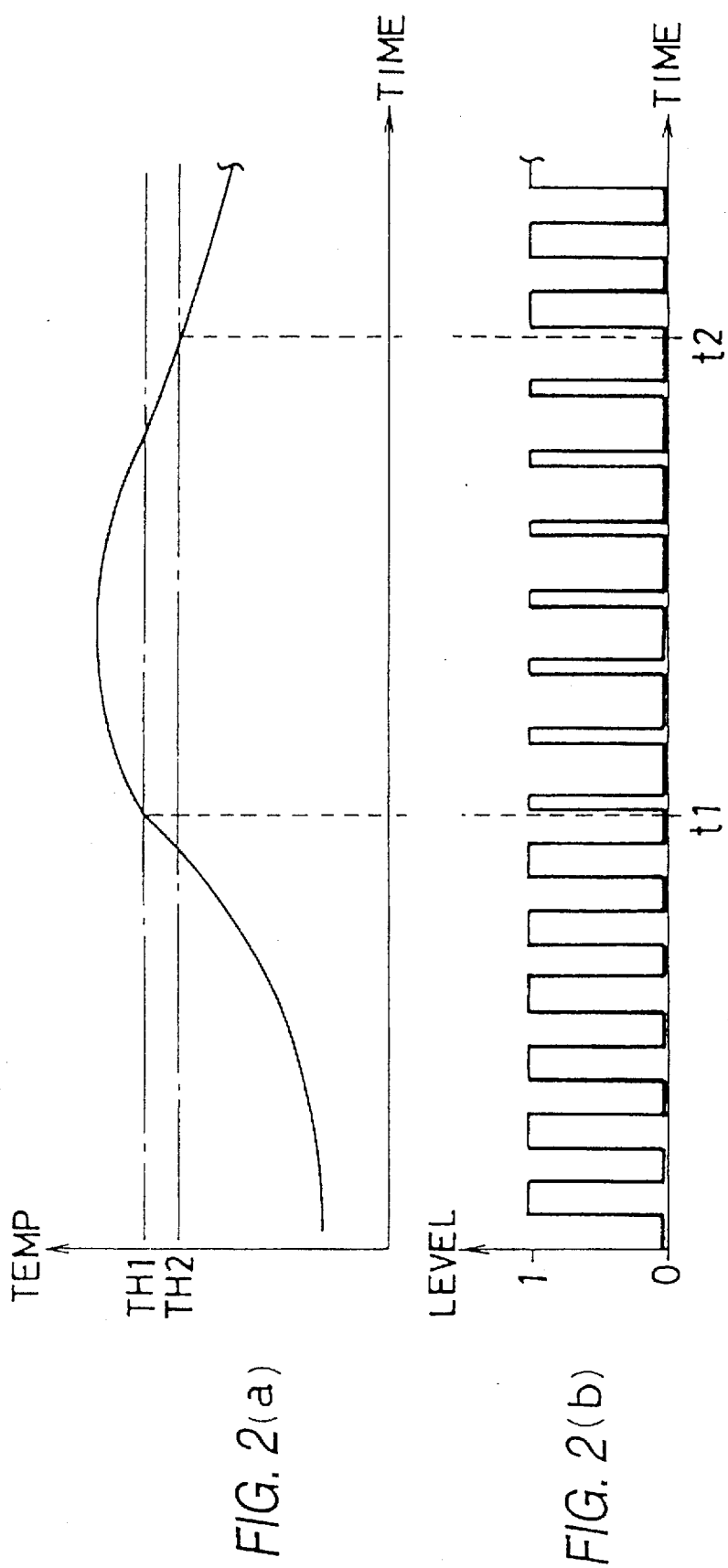

ELECTRONIC FLASHER SYSTEM

BACKGROUND OF THE INVENTION

1. Field of the Invention

The present invention relates generally to electronic flasher systems and, in particular, to an improved electronic flasher system in which a semiconductor switch device is intermittently operated depending on manipulation of a turn-signal switch and a hazard switch, thereby causing turn-signal flashing or hazard flashing by direction indicator lamps.

2. Description of the Related Art

Conventional electronic flasher systems are disclosed, for example, in Japanese Unexamined Patent Publication (Kokai) No. S64-90831 and Japanese Unexamined Patent Publication (Kokai) No. H2-164629. These conventional systems involve a semiconductor switch device connected to lamps, a flasher circuit for transmitting an intermittent signal to the semiconductor switch device, and a switch connected to the flasher circuit. The semiconductor switch device is intermittently operated in accordance with an operation of the switch, thereby causing the lamps to flash.

In such an electronic flasher system, the semiconductor switch device itself does not generate an operating sound. For enabling confirmation of flashing, an operating sound is generated in relation to the operating states of the flasher system by utilizing car stereo speakers, as disclosed, for example, by Japanese Unexamined Patent Publication No. S55-87630. Alternatively, a buzzer has been provided exclusively for generating an operating sound in an electronic flasher system.

However, where a semiconductor switch device is employed to cause flashing of a direction indicator lamp, the electric current flowing through the direction indicator lamp is so high that the semiconductor switch device itself is often heated to a large extent. Thus, if the direction indicator lamp is replaced with a lamp having a higher power output, or if an abnormal current flows through the semiconductor switch device caused, for example, by a short circuit in the electrical wiring, an abnormal heating may be caused in the semiconductor switch device, thereby inviting accidental damage of the switch device.

SUMMARY OF THE INVENTION

It is an object of the present invention to provide an electronic flasher system that solves the problems associated with the conventional flasher systems described above.

It is a further object of the present invention to provide an electronic flasher system which reduces the ON duty ratio of an intermittent signal inputted to a semiconductor switch device for suppressing electric power imposed on the semiconductor switch device and, hence, heating thereof, in the event of abnormal heating occurring in the semiconductor switch device.

Additional objects, advantages and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

In accordance with the present invention, in order to solve the problems described above, an electronic flasher system is provided comprising a flasher circuit for transmitting an intermittent signal, a semiconductor switch device for causing direction indicator lamps to turn-signal flash based on the intermittent signal, and a device-temperature detecting section for detecting heated temperature of the semiconductor switch device connected to the flasher circuit, whereby the ON duty ratio of the intermittent signal is altered in accordance with a temperature detecting signal inputted from the device-temperature detecting section.

In the electronic flasher system according to the present invention, the ON duty ratio of the intermittent signal is reduced when the temperature-detecting signal inputted to the flasher circuit from the device-temperature detecting section exceeds a predetermined threshold level.

The device-temperature detecting section may be arranged adjacent to the semiconductor switch device. Moreover, the flasher circuit, the semiconductor switch device, and the device-temperature detecting section may be arranged in one body to constitute a module unit.

BRIEF DESCRIPTION OF THE DRAWINGS

The present invention will become more clearly appreciated as the disclosure of the invention is made with reference to the accompanying drawings. In the drawings:

FIG. 2 is a time chart for explaining the function of the circuit shown in FIG. 1, wherein (a) shows a heated temperature of a semiconductor switch device, and (b) shows an intermittent signal inputted to the semiconductor switch device.

DETAILED DESCRIPTION OF THE PREFERRED EMBODIMENT

Figure 1:
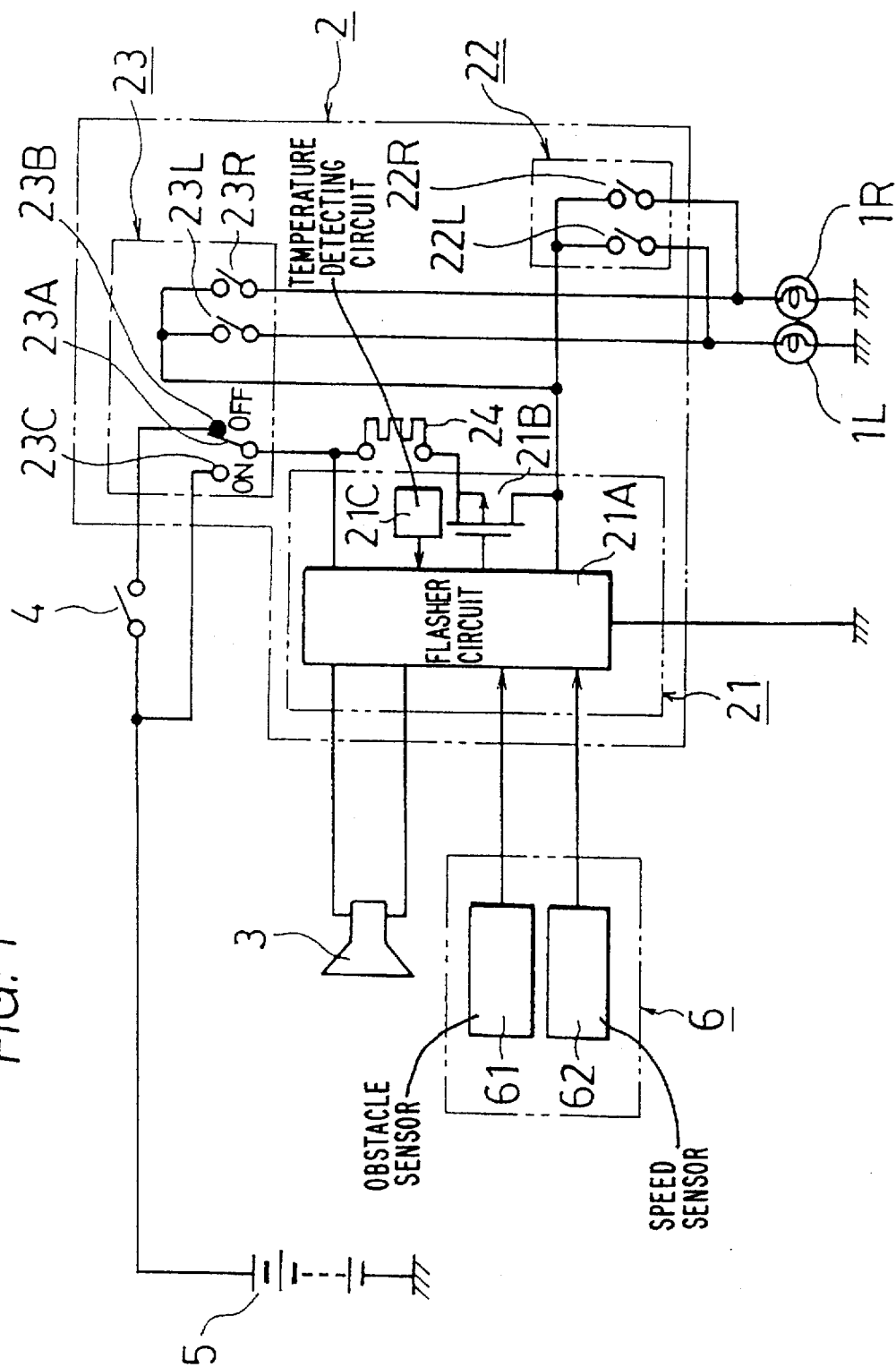
FIG. 1 is an electric circuit diagram showing a preferred embodiment of the present invention.

A preferred embodiment of the present invention will now be described with reference to FIGS. 1 and 2 of the accompanying drawings.

An electronic flasher system according to the preferred embodiment includes existing direction indicator lamps 1R and 1L provided on the left and right sides of a vehicle body, respectively. The direction lamps 1R, 1L are electrically connected through a harness to a combination switch body 2 provided on a steering column in the vehicle body. The combination switch body 2 is a switch which is collective of various operating switches, such as lighting-system operating switches, wiper-system operating switches, and turn-signal-system switches.

The combination switch body 2 includes a flasher circuit 21A, a semiconductor switch device 21B, a device-temperature detecting section 21C, a turn-signal switch 22, a hazard switch 23, and an electromagnetic wave detecting resistance 24.

The flasher circuit 21A is a circuit for controlling the semiconductor switch device 21B and a sound generator 3, depending on the state of signals inputted from the turn-signal switch 22, the hazard switch 23, the electric-current detecting resistance 24, a sensor 6, and the device-temperature detecting section 21C.

Specifically, the flasher circuit 21A functions to output respective intermittent signals to the semiconductor switch device 21B to cause the right-side direction indicator lamp 1R or the left-side indicator lamp 1L to turn-signal flash, and to cause the sound-generator 3 to generate signal-operating sounds, when an ON operating signal is inputted through a right-side contact 22R or a left-side contact 22L of the turn-signal switch 22, respectively.

The flasher circuit 21A also functions to alter the turn-signal sound generated by the sound generator 3, in dependence on an output signal from the sensor 6. For instance, the flasher circuit 21A makes the intermittent period of a turn-signal operating sound vary depending on an obstacle detecting signal inputted from an obstacle sensor 61. The flasher circuit 21A also makes the frequency of the turn-signal operating sound vary in accordance with a vehicle-speed detecting signal inputted from the vehicle-speed sensor 62 of the sensor 6. Thus, the driver can be alerted of situations surrounding the vehicle by merely listening to the turn-signal operating sound, for example, during a change of vehicle direction or running lanes.

When the flasher circuit 21A detects, from a temperature-detecting signal inputted from the device-temperature detecting section 21C, that the heated temperature of the semiconductor switch device 21B has become higher than a first threshold level TH1, the flasher circuit 21A acts to suppress electric power imposed on the semiconductor switch device 21B by reducing the ON duty ratio, thereby preventing the semiconductor switch device 21B from being damaged by heat. The flasher circuit 21A brings the ON duty ratio back to the former value when the heated temperature of the semiconductor switch device 21B is cooled lower than a second threshold level TH2.

The flasher circuit 21A shifts into a hazard flashing mode when an ON operating signal is inputted from the hazard switch 23, and an OFF mode when an OFF operating signal is inputted therefrom. In the hazard flashing mode, the flasher circuit 21A outputs an intermittent signal to the semiconductor switch device 21B to cause the right and left direction indicating lamps 1R, 1L to hazard-flash simultaneously. In the OFF mode, no output is made, thereby turning both lamps 1R, 1L off. Incidentally, the flasher circuit 21A, while in the hazard flashing mode, is adapted to give no output to the sound generator 3.

The flasher circuit 21A detects a drop of voltage across the electric-current resistance 24. When the level of voltage drop falls below a predetermined level, the flasher circuit 21A judges that a direction indicating lamp 1R, 1L is broken of its circuit, and changes the period of the intermittent signal outputted to the semiconductor switch device 21B to inform of the circuit breakage.

The semiconductor switch device 21B employs a MOS FET so that it is integrated together with the flasher circuit 21A and the device-temperature detecting section 21C to constitute a module unit 21.

The turn-signal switch 22 is a switch that turns ON and OFF when a lever (not shown) provided on the combination switch main body 2 is tilted. The turn-signal switch 22 is formed by a right-side contact 22R and a left-side contact 22L. The hazard switch 23 is a switch (e.g., provided on an instrument panel), which is formed by a tumbler switch or the like. The hazard switch 23 is constituted by a right-side contact 23R, a left-side contact 23L, a movable contact 23A, a normally closed contact 23B, and a normally opened contact 23C. The electric-current detecting resistance 24 is formed by a resistance with a low value for gaining a voltage drop of approximately 100 mV, which value is proportional to an electric current flowing through the direction indicating lamps 1R, 1L.

The sound generator 3 is formed by a piezoelectric buzzer built into the combination switch main body 2, or an existing speaker or the like installed on the vehicle body. The sensor 6 is adapted to output various signals in accordance with the operating state of the vehicle. The sensor 6 includes an obstacle sensor 61 for detecting an obstacle present around the vehicle and a vehicle-speed sensor 62 for detecting a running speed of the vehicle.

The combination switch main body 2 is connected with an ignition switch 4 and a direct-current power supply 5, as well as the direction indicating lamps 1R, 1L, the sound generator 3, and the sensor 6.

The operation of the electronic flasher system according to the preferred embodiment will now be explained.

With the ignition switch 4 in an ON operating state and the hazard switch 23 in an OFF state, if the flasher circuit 21A is inputted with an ON operating signal through the right-side contact 22R or the left-side contact 22L of the turn-signal switch 22, it outputs an intermittent signal to the semiconductor switch device 21B. As a result, the right-side direction indicator lamp 1R begins turn-signal flashing when the right-side contact 22R is turned ON, whereas the left-side direction indicator lamp 1L performs turn-signal flashing when the left-side contact 22L is turned ON.

On this occasion, the flasher circuit 21A also outputs an intermittent signal to the sound generator 3 such that the operating sound is varied in accordance with an output signal from the sensor 6. For instance, when the flasher circuit 21A is inputted from the obstacle sensor 61 with an obstacle detecting signal representing the presence of an obstacle near the vehicle, the flasher circuit 21A outputs short intermittent signals, thereby changing the operating sound accordingly. When the flasher circuit 21A is inputted from the vehicle-speed sensor 62 with a vehicle-speed detecting signal representing a high running speed of the vehicle, the frequency of operating sound is increased. Accordingly, the driver can be alerted to situations surrounding the vehicle by merely listening to the operating sound of the sound generator 3 when changing a vehicle direction or running lane.

The flasher circuit 21A detects the heated temperature of the semiconductor switch device 21B based on a temperature detecting signal inputted from the device-temperature detecting section 21C. The flasher circuit 21A varies the ON duty ratio of the inputting intermittent signal to the semiconductor switch device 21B in accordance with the temperature. FIG. 2 is a time chart exemplifying the relation between the temperature detected by the device-temperature detecting section 21C and the ON duty ratio of the intermittent signal inputted to the semiconductor switch device 21B.

As shown in FIG. 2, the heated temperature is lower than the first threshold level TH1 up to time t1, so that the ON duty ratio of the intermittent signal inputted to the semiconductor switch device 21B is set to, for example, approximately 50%. When the heated temperature exceeds the first threshold value TH1 at the time t1, the ON duty ratio of the intermittent signal, which is inputted to the semiconductor switch device 21B, is changed to, for example, approximately 20%. By reducing the ON duty ratio of the intermittent signal, the semiconductor switch device 21B can be suppressed of electric power imposed thereon. As a result, the semiconductor switch device 21B is cooled and prevented from being damaged by heat. Thereafter, when the heated temperature becomes lower than a second threshold level TH2 at time t2, the ON duty ratio is returned to the former value of approximately 50%.

When the hazard switch 23 is switched to the ON position, the right-side and left-side contacts 23R, 23L are turned ON, and the movable contact 23A is brought into connection with the normally-open contact 23C. This brings the flasher circuit 21A into a hazard flashing mode, so that it outputs an intermittent signal to the semiconductor switch device 21B, thereby causing the direction indicator lamps 1R, 1L on the right and left sides to hazard-flash. By switching the hazard switch 23 to the OFF position, the flasher circuit 21A is turned to an OFF mode, whereby both of the lamps 1R, 1L are turned off.

The flashing circuit 21A detects a drop of voltage across the current detecting resistance 24 during the time period while the direction indicator lamps 1R, 1L perform turn-signal flashing or hazard flashing. When the level of the voltage drop is below a predetermined level, the flasher circuit 21A determines that a direction indicator lamp 1R, 1L has been broken of its circuit. The flasher circuit 21A is then operated to change the period of the intermittent signal outputted to the semiconductor switch device 21B. This makes it possible to alert the operator of a circuit-breakage or malfunction of the direction indicator lamps 1R, 1L.

The embodiment described above performs a control to reduce the ON duty ratio of intermittent signals being inputted to the semiconductor switch device when the heated temperature detected by the device-temperature detecting section exceeds a predetermined threshold level. However, the ON duty ratio can, alternatively, be continuously varied in proportion to an output from the device-temperature detecting section.

As stated above, an electronic flasher system according to the present invention comprises a flasher circuit for transmitting an intermittent signal, a semiconductor switch device for causing direction indicator lamps to turn-signal flash based on the intermittent signal, and a device-temperature detecting section for detecting heated temperature of the semiconductor switch device connected to the flasher circuit, whereby the intermittent signal is altered of the ON duty ratio in accordance with a temperature detecting signal inputted from the device-temperature detecting section. Accordingly, if abnormal heating occurs in the semiconductor switch device due to certain causes, the electric power imposed on the semiconductor switch device is suppressed, thereby relieving heating therefrom. An effect is thus provided in that the semiconductor switch device is prevented beforehand from being accidentally damaged due to abnormal heating thereof.

Also, the ON duty ratio of the intermittent signal is reduced when it is determined that a predetermined temperature threshold level has been exceeded based on the temperature-detecting signal inputted to the flasher circuit from the device-temperature detecting section. This provides an effect that only the electric power imposed on the semiconductor switch device is suppressed without varying the period of flashing for the direction indicator lamps.

Further, the device-temperature detecting section is arranged adjacent to the semiconductor switch device. This provides an effect that if abnormal heating occurs in the semiconductor switch, the heating is detected without retardation.

The flasher circuit, the semiconductor switch device, and the device-temperature detecting section are arranged in one body to constitute a module unit. This provides an effect that the temperature of the semiconductor switch device is directly detected by the device-temperature detecting section with a compact structure.

It will be appreciated that the present invention is not limited to the exact construction that has been described above and illustrated in the accompanying drawings, and that various modifications and changes can be made without departing from the scope and spirit thereof. It is intended that the scope of the invention only be limited by the appended claims.

What is claimed is:

1. An electronic flasher system, comprising:
   a flasher circuit (21A) for transmitting an intermittent signal;
   a semiconductor switch device (21B) for causing direction indicator lamps (1R, 1L) to turn-signal flash based on the intermittent signal; and
   a device-temperature detecting section (21C) connected to said flasher circuit (21A) for detecting a temperature of said semiconductor switch device (21B);
   whereby an ON duty ratio of the intermittent signal is altered in accordance with a temperature detecting signal inputted to said flasher circuit from said device-temperature detecting section (21C).

2. The electronic flasher system according to claim 1, wherein the ON duty ratio of the intermittent signal is reduced when the temperature of the switch device, as determined by the temperature-detecting signal inputted to said flasher circuit (21A) from said device-temperature detecting section (21C), exceeds a predetermined threshold level.

3. The electronic flasher system according to claim 2, wherein said device-temperature detecting section (21C) is arranged adjacent to said semiconductor switch device (21B).

4. The electronic flasher system according to claim 3, wherein said flasher circuit (21), said semiconductor switch device (21B), and said device-temperature detecting section (21C) are arranged in one body to constitute a module unit (21).

5. The electronic flasher system according to claim 2, wherein said flasher circuit (21), said semiconductor switch device (21B), and said device-temperature detecting section (21C) are arranged in one body to constitute a module unit (21).

6. The electronic flasher system according to claim 1, wherein said device-temperature detecting section (21C) is arranged adjacent to said semiconductor switch device (21B).

7. The electronic flasher system according to claim 1, wherein said flasher circuit (21), said semiconductor switch device (21B), and said device-temperature detecting section (21C) are arranged in one body to constitute a module unit (21).

8. An electronic flasher system, comprising:
   a flasher circuit means for transmitting an intermittent signal;
   a semiconductor switch device for causing direction indicator lamps to flash based on the intermittent signal;
   a temperature detecting means for detecting a temperature of said semiconductor switch device, said temperature detecting means having an output connected to said flasher circuit means; and
   means for reducing an ON duty ratio of the intermittent signal transmitted from the flasher circuit means when the temperature of the semiconductor switch device exceeds a first predetermined threshold level.

9. The electronic flasher system according to claim 8, further comprising means for increasing the ON duty ratio of the intermittent signal when the temperature of the semiconductor switch device falls below a second predetermined threshold level after having exceeded said first predetermined threshold level.

10. The electronic flasher system according to claim 9, wherein said first predetermined threshold level is greater than said second predetermined threshold level.

11. The electronic flasher system according to claim 8, wherein said temperature detecting means is arranged adjacent to said semiconductor switch device.

12. The electronic flasher system according to claim 8, wherein said flasher circuit means, said semiconductor switch device, and said temperature detecting means are arranged together in a single module unit.

\* \* \* \* \*